Aug. 2, 1955  K. C. SCHMOCKER  2,714,639
ELECTRIC SWITCHES
Filed Oct. 8, 1953  6 Sheets-Sheet 1
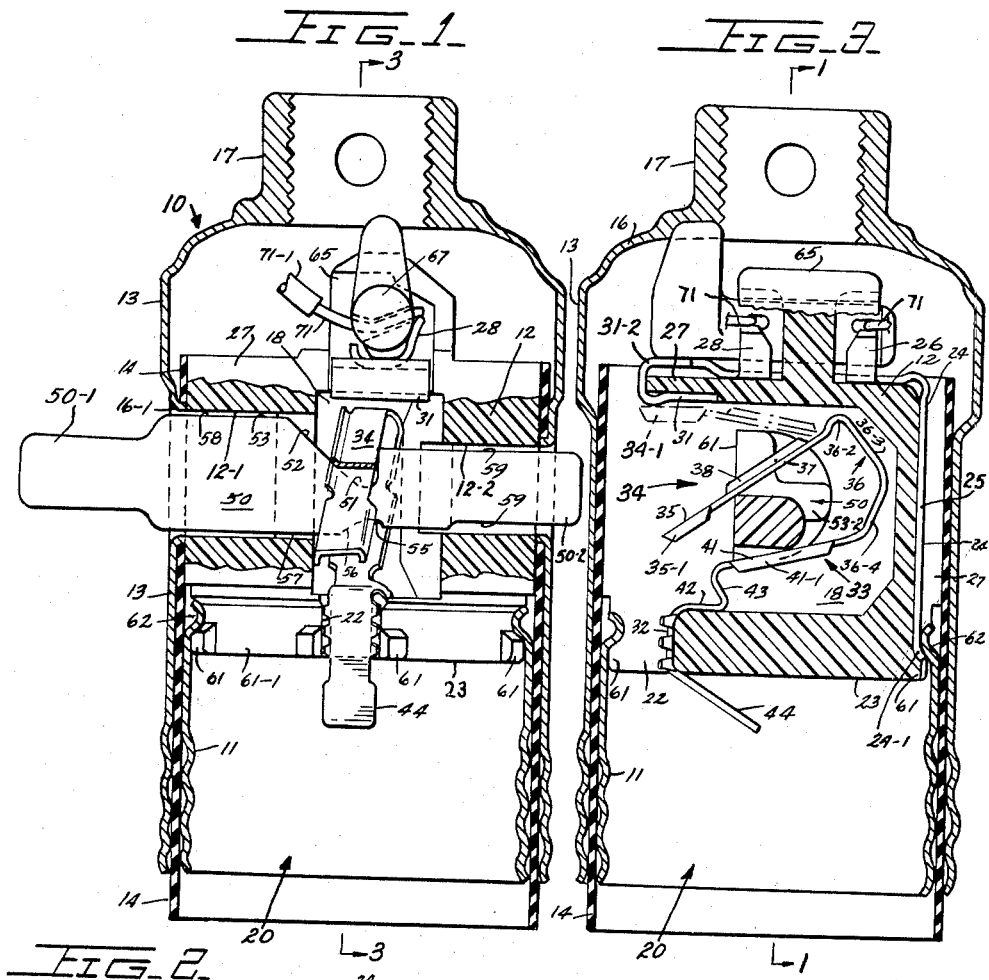
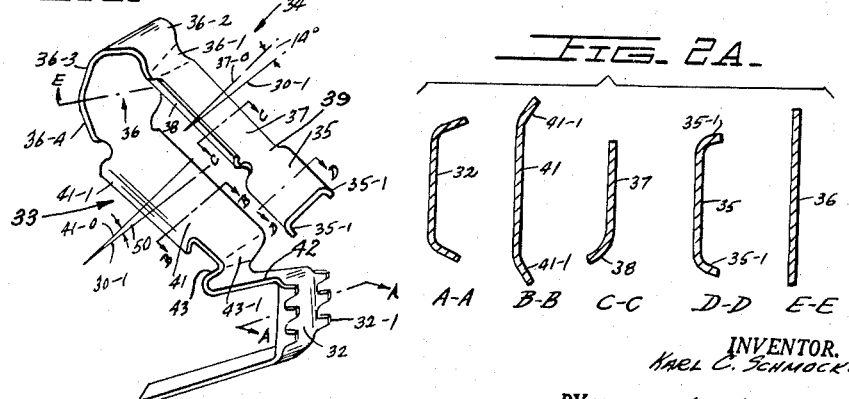
INVENTOR.
KARL C. SCHMOCKER
BY Greene, Pineles and Durr
ATTORNEYS

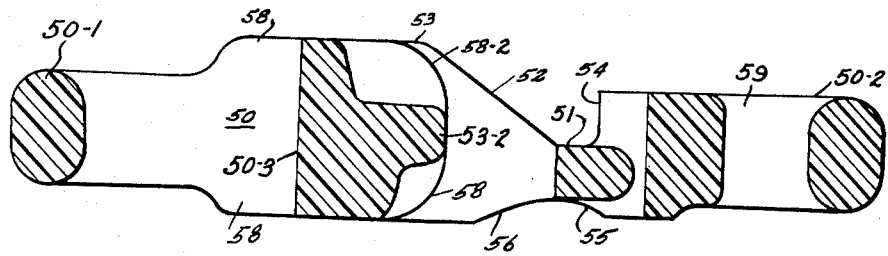
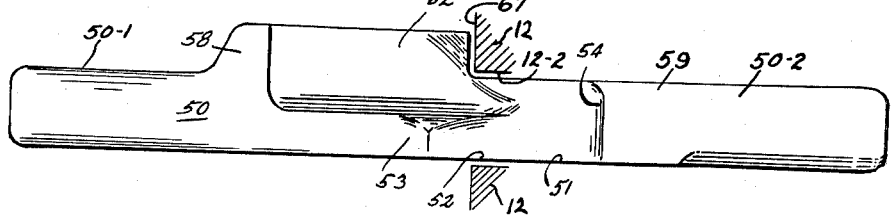
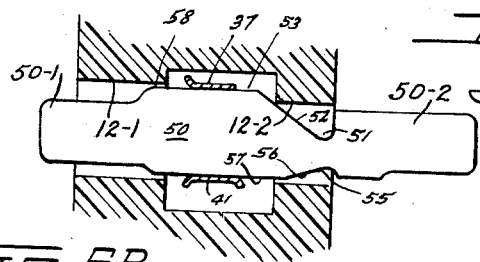
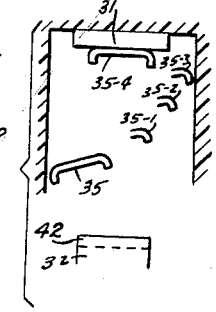
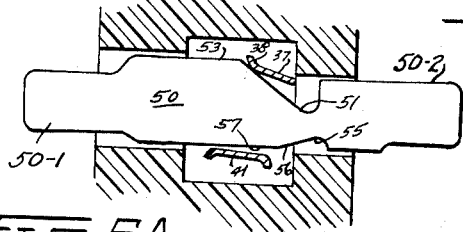
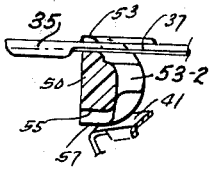
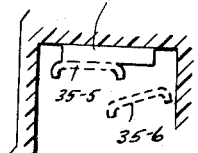
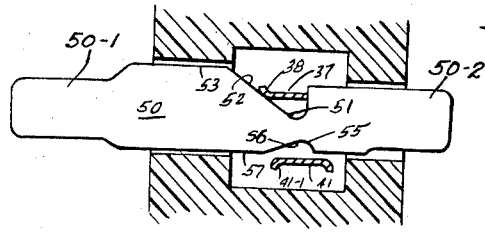
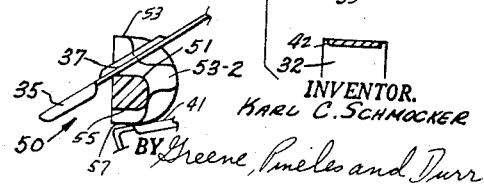

Aug. 2, 1955 K. C. SCHMOCKER 2,714,639
ELECTRIC SWITCHES
Filed Oct. 8, 1953 6 Sheets-Sheet 3
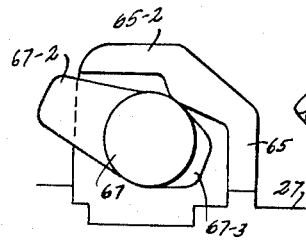
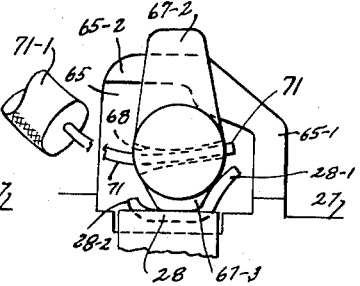
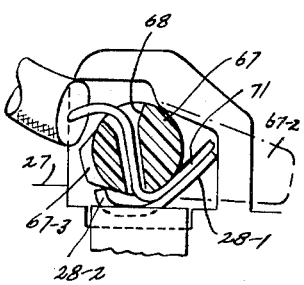
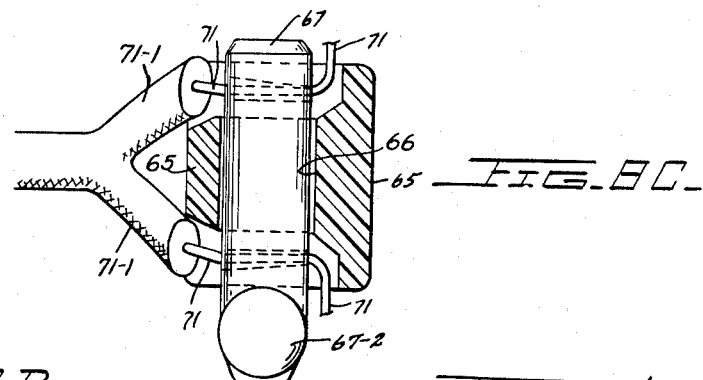
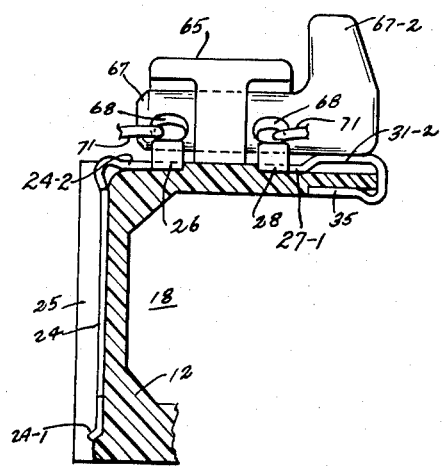
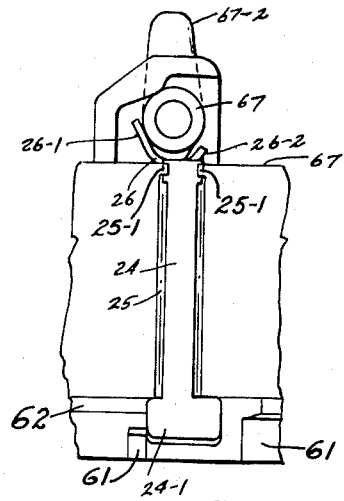
INVENTOR.
KARL C. SCHMOCKER
BY Greene, Pineles and Durr
ATTORNEYS

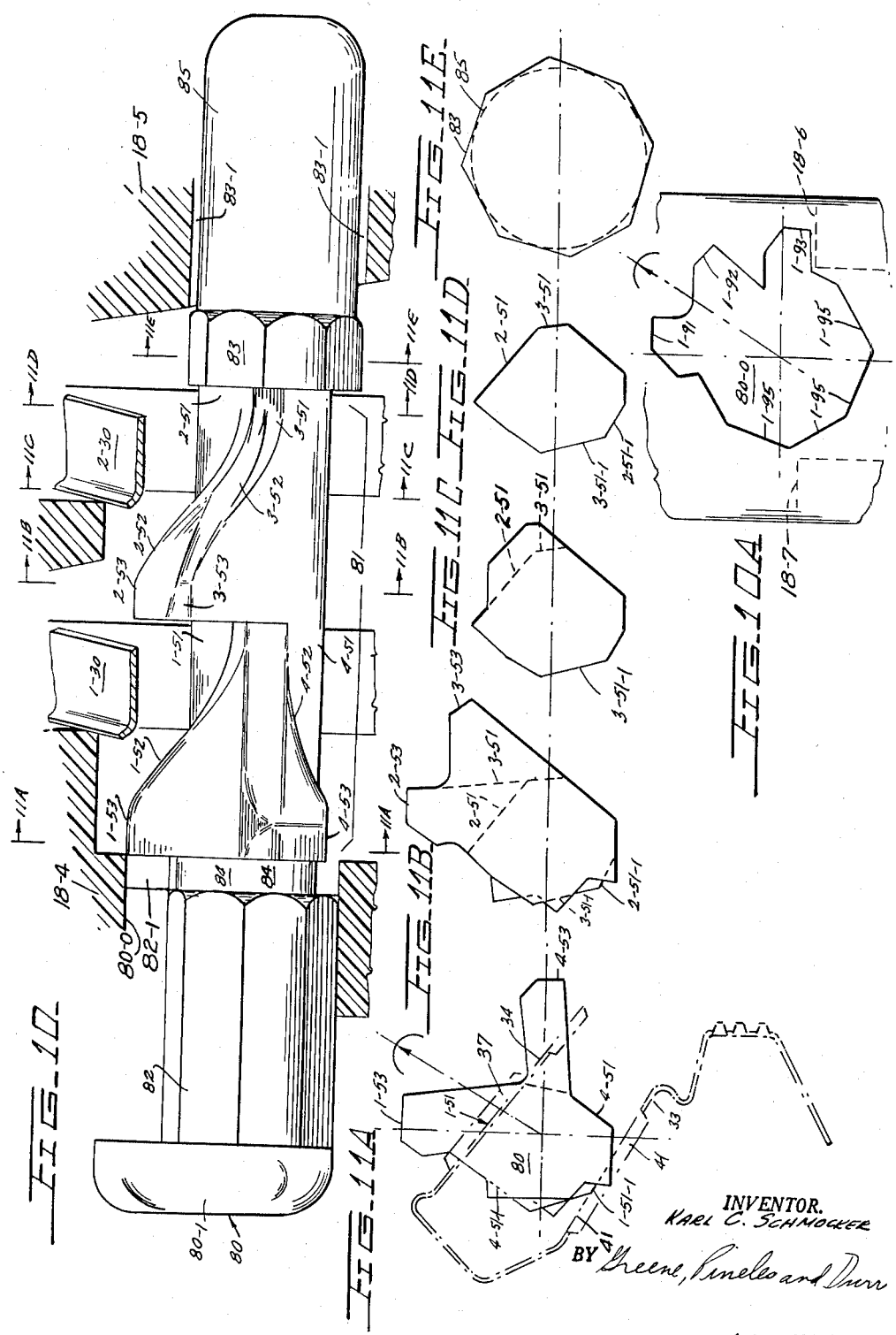

Aug. 2, 1955  K. C. SCHMOCKER  2,714,639
ELECTRIC SWITCHES
Filed Oct. 8, 1953  6 Sheets-Sheet 5
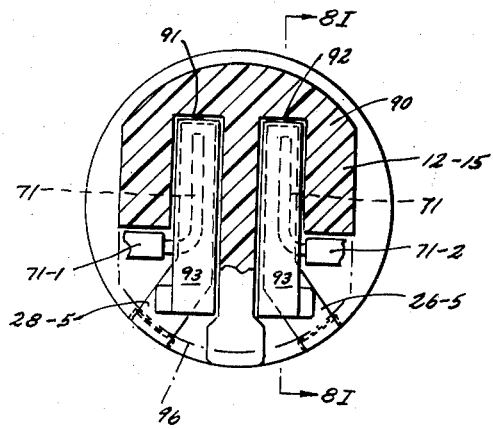
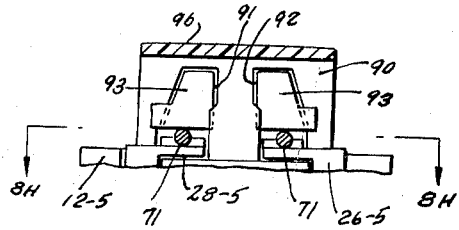
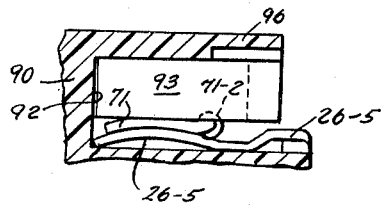
INVENTOR.
K. C. SCHMOCKER
BY
Greene, Pineles & Durr
ATTORNEYS

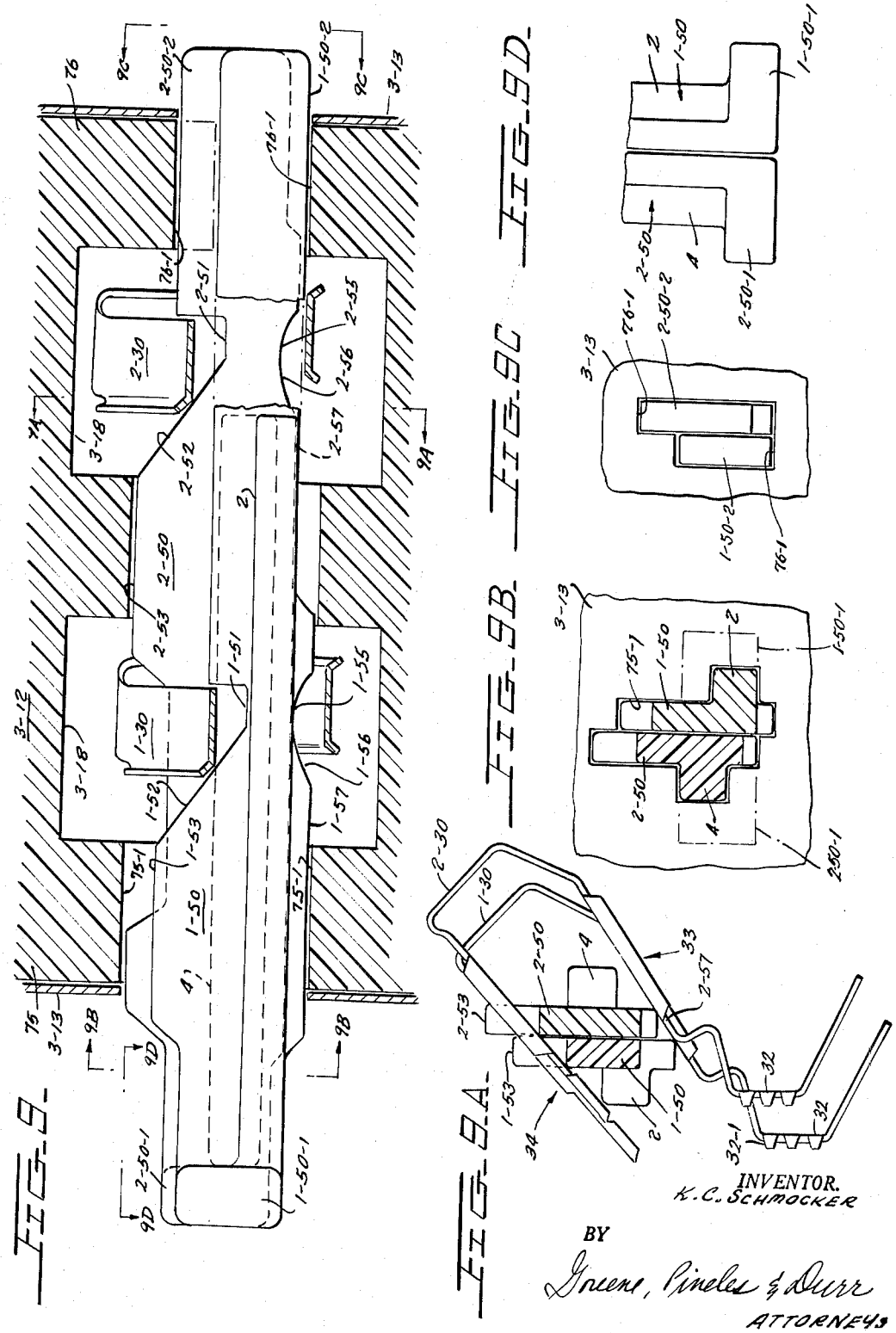

United States Patent Office 2,714,639
Patented Aug. 2, 1955

2,714,639

ELECTRIC SWITCHES

Karl C. Schmocker, White Plains, N. Y., assignor to Belmar Electric Corporation, Tilton, N. H., a corporation of New York Application October 8, 1953, Serial No. 384,817

28 Claims. (Cl. 200—69)

This invention relates to electric switches, and more particularly to snap action switches, although some of the phases of the present invention are of broader application.

This application is a continuation in part of my application Ser. No. 314,272, filed October 11, 1952, now abandoned.

Among the objects of the invention is a novel switch which closes and/or opens in a reliable manner with a snap action and which is at the same time simple in construction, inexpensive to manufacture, easy to assemble and disassemble, and has a long operating life.

Among the objects of the invention is also a multiple switch arrangement having at least two movable switch members combined with actuating elements selectively operable so that movement of the actuating elements between an open and a closed position will selectively close or open either one or the other of the two switches or both switches.

An object of the invention is an electric switch having its principal elements—without one or more switch actuating elements—mounted in assembled position on an associated mounting structure or switch body, and arranged to be inserted as a unit through a relatively wide opening of a switch housing, the actuating element being insertable and releasably interlocked in its operative position within the switch body through passage openings of the switch housing, with the actuating element being also effective in releasably interlocking the switch body with the switch housing.

Another object of the invention is an electric switch which is combined with the associated elements of a conventional electrical lamp socket, so that the switch body or switch mounting structure with the associated elements of the socket body may be inserted as a unit—but without the switch actuating element—through the relatively wide opening of a conventional lamp socket housing, which housing may be made in the form of an integral structure, the actuating member being insertable and releasably latched in its operative position within the switch structure with the actuating member being also effective in releasably interlocking the switch and socket body with the socket housing.

A further object of the invention is a novel socket and switch body for electric lamp sockets which is of greatly simplified construction and materially reduces the cost of lamp sockets.

The foregoing and other objects of the invention will be best understood from the following description of exemplifications thereof.

In the accompanying drawings showing exemplifications of the invention.

Fig. 1 is a vertical cross-sectional view of one exemplification of the switch of the invention as part of an electric lamp socket;

Fig. 2 is a perspective view of the switch member of Fig. 1;

Fig. 2A is an exploded view showing the cross-section of the switch member of Fig. 2 along lines A—A, B—B, C—C, D—D, E—E;

Fig. 3 is a cross-sectional view similar to Fig. 1 along lines 3—3 of Fig. 1;

Figs. 4 and 5 are side and top views respectively of the elongated actuating member of the switch of Figs. 1–3;

Figs. 6A, 6B, 6C are explanatory views similar to Fig. 1 showing the switch actuating member and cooperating portions of the switch member in different positions as it is moved from the open to the closed position;

Figs. 6D, 6E, 6F are side views of the elements shown in and correspondings to Figs. 6A, 6B, 6C, respectively;

Fig. 7A is an explanatory view similar to Fig. 1 showing the contact portion of the switch member as it is moving from the closed to the open position;

Fig. 7B is a view similar to Fig. 7A of the same contact portion as it is moved from the open to the closed position;

Fig. 8A is a detail view similar to Fig. 1 of the terminal connector arrangement of a socket switch;

Fig. 8B is a side view of the connector arrangement of Fig. 8A;

Fig. 8C is a top view of the connector arrangement of Fig. 8A;

Fig. 8D is a front view of the connector arrangement of Fig. 8C;

Fig. 8E is a view similar to Fig. 8D with the portion of the structure in cross-section;

Fig. 8F is a view similar to Fig. 8D of the same elements as seen from the back;

Fig. 8G is a view similar to Fig. 8C of another form of terminal connector arrangement of a socket switch;

Fig. 8H is a vertical cross-sectional view of the connector arrangement of Fig. 8G;

Fig. 8I is a vertical cross-sectional view along lines 8I—8I of Fig. 8G;

Fig. 9 is a view similar to Fig. 1 of a two switch arrangement of the invention forming part of a lamp socket for a three terminal light bulb arranged to have either one or both light elements of the light bulb connected to the electric supply line;

Fig. 9A is a cross-sectional view along lines 9A—9A of Fig. 9;

Figs. 9B, 9C, 9D are cross-sectional views along lines 9B—9B, 9C—9C, 9D—9D of Fig. 9;

Fig. 10 is a view similar to Fig. 1 of another form of a two switch arrangement of the invention of the type shown in Fig. 9;

Fig. 11A is a transverse view of the switch arrangement along lines 11A—11A of Fig. 10;

Figs. 11B, 11C, 11D and 11E are cross-sectional views along lines 11B—11B, 11C—11C, 11D—11D, 11E—11E of Fig. 10;

Fig. 10A is a side view of the socket core portion of the switch of Fig. 10.

Although various features of the switch arrangements of the invention have many other applications, and may be combined with other elements into automatic circuit breakers, relays and other like structures, one form of a switch exemplifying the invention will be described in its application to an electrical lamp socket for conventional screw-type electric light bulbs.

Figs. 1 to 5 show the principal elements of a screw-type lamp socket combined with one form of a switch exemplifying the invention. The lamp socket 10 is of the conventional type for holding the screw terminal base of a conventional electric light bulb within the threaded metallic terminal sleeve 11, the rear part of which is affixed to the rigid insulating mounting body 12 with which it forms the socket core 20.

The rigid insulating mounting body 12 is made by molding, for instance, and it has a shape of a generally cylindrical short block held in a generally cylindrical socket housing 13. The socket housing 13 may be of metal and is separated by an insulating sleeve 14 from the metallic elements of the core 12. The socket housing 13 is open at one end and has a closure end wall or cap 16 with a threaded coupling collar 17 at the other end. The socket mounting body 12 carries a movable flexible metallic switch member 30 arranged for movement in a switching direction between the open position shown in full lines in Fig. 3 to the closed position shown by dash lines 34–1 in which it makes contact with the fixed metallic switch member 31 which is affixed to upper mounting body wall portion 27. The flexible switch member 30 has an inner switch arm 33 with a mounting portion 32 secured to the mounting wall portion 23 of the insulating body 12. The inner switch arm 33 carries at an arm spacing from the mounting wall portion 21 a movable outer contact switch arm 34 arranged to be moved from the open position of Fig. 3 to the closed dash-line position 34–1.

The switch member 30 is actuated by movement of a switch actuating member 50 from the open position shown in Fig. 1 to the closed position at the right thereof, Figs. 6A, 6B, 6C, showing three consecutive positions of the actuating member 50 as it is moved to the closed position. The switch member 30 is opened by return movement of the actuating member 50 to its left open position shown in Fig. 1.

The switch member 30 is formed of an elongated strip of highly elastic and highly conductive metal, such as beryllium copper, the strip being permanently deformed into a generally S-shaped loop as seen in Figs. 2, 3.

The outer switch arm 34 has a contact portion 35 with which it makes and opens its contact with the fixed switch contact 31. The switch contact 35 is rendered rigid or stiff by two marginal side flanges 35–1. The outer switch contact arm 34 has also an intermediate actuating portion 37 which is rendered stiff by a marginal side flange 38. The actuating switch portion 37 is connected through a flexible arm portion 39 to its forward contact portion 35.

The stiff outer switch actuation portion 37 is joined to the inner arm 33 by an intermediate generally U-shaped or arc shaped elbow portion 36 which permits elastic flexing of the outer switch arm 34 relatively to the inner switch arm 33 when the outer switch arm 34 is moved in the switching direction from the open position Fig. 3 to the closed position 6A and also to permit lateral flexing of the outer switch arm 34 relatively to the switching direction when closing or opening the circuit. The inner switch arm 33 has an intermediate backing arm portion 41 which is rendered stiff or rigid by marginal side flanges 41–1. The inner switch arm 33 is joined to its mounting portion 32 and the adjoining flexible rear stem portion 42 by an S-shaped flexible strip portion 43 which permits displacement of the inner arm 33 in rearward or downward direction toward the mounting wall portion 23 as seen in Fig. 3.

The flexible switch member 30—when used for actuation to the closed position by an actuating member 50 movable from left to right transverse to the switching direction as seen in Fig. 1—has in the released open position in which it is shown in Figs. 1, 2, 3 and in the full line portion of 7A, the following features:

The forward contact end portion 35 is displaced laterally to the left of the inner arm 33 and its rear stem portion 42 as seen in Figs. 1, 6A and 7A. The stiff inner arm portion 41 is permanently twisted out of the normal plane of the metal strip from which it is formed so that a transverse formation line 41–0 of arm portion 41 is inclined under an angle of about 5° relatively to normal transverse strip base surface of the original metal strip which is indicated in Fig. 2 by horizontal base line 30–1. The stiff outer contact arm portion 37 is permanently twisted from the normal strip base surface so that a transverse formation line 37–0 thereof is at an angle of about 14° to 15° relatively to a transverse base line 30–1 of the switch strip member 30 indicated in Fig. 2 by the horizontal base line 30–1.

The inner stiff contact portion 41 is given the desired permanent twist deformation by forming action applied to the junction region indicated in Fig. 2 by dash lines 43–1. The outer contact arm is given the desired permanent twist deformation by forming action applied to the junction region thereof indicated in Fig. 2 by the dash lines 36–1.

The flexible U-shaped switch elbow 36 is formed so that flexible arm section 36–2 is bent slightly forward relatively to the adjoining stiff outer arm section 37; and that the adjoining flexible arm sections 36–2 and 36–3 enclose an angle of about 98°; that the adjoining flexible arm sections 36–3 and 36–4 enclose an angle of about 120°; and that the adjoining flexible arm section 36–4 and 41 enclose an angle of about 130°. Although Fig. 3 indicates that the individual switch arm sections 36–2, 36–3, 36–4 and 41 of the flexible elbow region 36 are at definite angles relatively, good results are obtained with the flexible switch elbow region 36 shaped to form a continuous curve extending along the several angularly disposed arm sections 36–2, 36–3, 36–4.

For switches designed for actuation by a similar actuating member 50 which moves in opposite direction from right to the left as seen in Fig. 1, the different elements of the flexible switch member 30 are shaped for cooperation in an analogous manner with the approaching control elements of the actuating member 50 moving in opposite direction.

In accordance with the invention, the flexible switch member 30 and the cooperating actuating member 50 are so designed that the initial switching movement of the actuating member 50—from its open position shown in Fig. 6A to its right hand closed position shown in Fig. 6C—causes the outer switch contact arm 34 to be elastically flexed laterally to the switching movement as it is moved toward the outward forward closed position against the action of its elastic restoring forces; and that further movement of the actuating member 50 to its closed position releases the restoring energy stored in the switch member 30 by its lateral flexing for bringing the switch contact portion 35 with a snap action into contact with the fixed contact 31.

In accordance with a further phase of the invention, the initial movement of the actuating member 50—from its closed position shown in Fig. 6A—causes the outer switch contact arm 34 to be flexed laterally relatively to the path of its inward opening motion against the action of its elastic restoring forces while remaining in contact with the fixed switch contact 31; and further movement of the actuating member 50 to its open position shown in Fig. 6A causes a release of the restoring energy stored in the outwardly flexed switch member 30 for causing the contact portion 35 of the switch member to be released with a snap action from the fixed switch contact 31 and to return the actuating member 50 to its open position shown in Fig. 6A as the outer contact arm 34 is returned to its open position shown in Fig. 3 by its elastic restoring forces.

The actuating member structure 50 and its elements consist of an electrically insulating rigid shaped elongated body arranged to move transverse to the switching direction across the switch compartment 18 through the arm spacing between the contact arm 34 and the mounting wall 21 of the mounting body 12. In this transverse movement, the elongated actuating member 50 engages both the outer stiff contact arm portion 37 and the inner stiff contact arm portion 41 of switch member 30.

The intermediate region of the elongated actuating member 50 is provided on the forward or upper side (as seen in Figs. 4 to 6C) with a set of shaped control or cam surfaces as follows: A notch-like depressed cam surface portion 51 rising to the left along a forwardly tapering cam surface 52 to an outer cam surface portion 53. The depressed cam surface portion 51 of the actuating member 50 is followed at the right by an abruptly rising cam portion 54 which bounds with the tapered cam surface 52 a locking recess or notch within which the stiff upper contact arm portion 37 is held interlocked to prevent removal of the actuating member 50 from its operative position within the switch 30. The actuating member 50 is provided at its bottom or rearward side (as seen in Figs. 1, 4 to 6C) with a set of controls as follows: A shallow cam surface portion 55 rising to the left along a rearwardly tapering cam surface 56 to a raised cam surface portion 57 and rising on its right side to the rearward maximum level of the actuating member 50.

The forwardly tapering cam surface 52 and the opposite rearwardly tapering cam surface 53 reach their opposite raised cam surface portions 53, 57 at substantially the same vertical transverse formation line of the actuating member 50. The actuating member 50 has also at its opposite end regions a wider guide portion 58 and a narrow guide portion 59, respectively—extending from the opposite ends of intermediate cam surface portions 51 to 57 (as seen in Fig. 1)—which guide the actuating member 50 within opposite guide wall passage openings 12–1, 12–2 of the insulating mounting body 12. The guide passage openings 12–1, 12–2 are of substantially D-shape and have one flat guide surface arranged to guide a flat guide wall surface 50–3 of the actuating member 50.

One side of the cam surface region of the actuating member 50 has a laterally raised stop portion 53–2 (Figs. 4, 5) which engages and is stopped by the inward side compartment wall 67 of the mounting body 12 to stop movement of the actuating member 50 in its switch closing position.

The upwardly facing outer cam surface portion 53 (Figs. 1, 3, 4, 5) is of smaller thickness than the recessed cam surface region 51 thereof and they merge along smooth curved surfaces (Figs. 3, 4 and 5). The downward cam surface regions 55, 56 and 57 likewise merge along smooth curved surfaces to provide like the upwardly facing cam surface regions 51 to 53 smooth control action when actuating the flexible switch member 30 either from the open to the closed position or from the closed to the open position. All these cam surfaces 51 to 57 are curved smoothly in their frontwise direction where they face the curved upper side flange 38 of the stiff upper contact arm portion 37 and the corresponding downward side flange 41–1 of the stiff inner contact arm portion 41.

The elongated actuating member 50 has opposite grip end portions 50–1, 50–2, at least one of which is exposed along the exterior of the mounting body 12 and of the socket housing 13 so that one of them may be manually engaged for pushing it from one switch position to the opposite switch position.

Only a relatively narrow zone of the longitudinally extending curved opposite cam surface portions 51 to 53 and 55 to 57 come into engagement with facing flanged edges of the stiff outer and inner contact arm portions 37 and 41 when the rightward movement of the actuating member (as seen in Figs. 1, 6A to 6C) acts on these flanged edges as the contact arm 30 is thereby brought between the open position (Fig. 3) and the closed position (Fig. 6A) and frictional movement resistance is thus minimized.

*Closing of switch.*—In the rightward movement of the actuating member 50 from its open position (Figs. 1, 6A) toward the right closed position—the upwardly tapering cam 52 engages the flanged edge of stiff contact arm portion 37 thereby raising it upwardly and also moving it laterally to the right (Figs. 1 and 6A, 6B) thereby elastically deforming the flexible switch member 30 until contact arm portion 37 is raised to the upper cam surface 53 (Fig. 6C).

Fig. 7A shows the different positions to which the contact portion 35 of the upper movable switch arm 34 is brought in relation to its fixed mounting portions 42 and 32 when the actuating member 50 is moved from its open position of Fig. 6A past the intermediate position of Fig. 6B to its rightward closed position of Fig. 8C. Near the end of its movement to its closed position, the upwardly tapering cam 52 brings switch contact portion 35 to an extreme rightward lateral position at 35–3 (Fig. 7A) at a moment when the stiff upper contact arm portion 37 is about to leave the tapered cam surface 52 and reach the upward cam surface 53 somewhat beyond the position shown in Fig. 6B. The instant the flanged edge of contact arm portion 37 moves rightward from the upwardly tapering cam surface 52 to the level of the upper cam surface 53, the laterally displaced stiff upper contact arm portion 37, upon being released from the tapered cam surface 52, moves with a snap action to the left along the upper level cam surface 53 (Fig. 6C) thereby bringing the contact end portion 35 with a snap and a constant wiping action into contact with the fixed switch contact 31, (Fig. 7A).

When the actuating member moves from the open position (Figs. 1 and 6A) to its closed position (Fig. 6C) the lower tapered cam surface portion 56 comes similarly into engagement with the flanged edge of stiff inner contact arm portion 41 and imparts thereto a downward deforming movement in a direction opposite to the upward deforming movement of the outer contact arm 34. By this action, additional restoring energy is stored in the flexible elements 43, 42 of the contact arm 33 thereby providing additional backing pressure forces which increase the pressure with which the actuating member 50 presses the upper contact portion 35 into contact engagement with the fixed switch contact (Fig. 6C).

When the rightward movement of actuating member 50 has brought the upper contact portion 35 to the switch closing position (Fig. 6C), the upper contact arm 37 and stiff inner backing arm portion 41 are seated against the opposite generally level raised actuating cam portions 53, 57 in which position the switch member 30 and the actuating member 50 are in stable equilibrium.

*Opening of the switch.*—Opening of the switch is effected by applying a pushing force to actuating member end 50–2 projecting through the right side opening of the socket housing (Figs. 1 and 6C). The fixed switch contact 31 offers only negligible frictional resistance to the movement of the movable switch portion 35 along their contacting surfaces. Because of the substantial frictional resistance between the back surface of the stiff upper contact arm portion 37 and the underlying cam portion 53, the movement of the actuating member 50 from the closed position (Fig. 6C) toward the leftward open position imparts to the upper contact arm portion 37 and its contact portion 35 a lateral leftward movement in relation to the direction of its circuit-opening movement, thereby bringing the upper contact portion 35 from its central position against the fixed contact 31 shown in Fig. 7A to the leftward position 35–5 shown in Fig. 7B.

The further leftward movement of the actuating member 50 toward the left open position brings the upper end of the downwardly tapering actuating cam surface 52 against the left flanged edge 38 of upper contact arm portion 37, whereupon the stiff upper contact arm portion 37 is suddenly released from its holding engagement with the upper level cam surface 53 of the actuating member 50 and its elastic restoring forces cause the upper contact arm 34 to be returned with a snap action to its open position shown in Fig. 6A. This snap action releases its upper arm contact portion 35 with a snap and contact wiping action from its contact with fixed switch contact 31.

The moment the left flanged edge 38 of upper contact arm 37 (Fig. 6C) is released with a snap action onto the downwardly tapering upper actuating cam 52 of switch actuating member 50, the released elastic restoring energy of switch 30 causes its flanged upper contact arm portion 37 acting on the downwardly tapering inclined actuating surface 52 of the actuating member 50 to return it with a snap action to its leftward open position (Fig. 6A). In the course of this opening movement, the switch contact portion 35 moves successively through the intermediate position (at 35–6 in Fig. 7B) to the open released position. Thus, the suddenly released oppositely deformed arms of elastic switch member 30 cause both the stiff outer contact arm portion 37 and the stiff inner switch arm portion 41 to impart to the opposite inwardly tapered actuating member cam surfaces 52 and 56 of actuating member 50 embraced thereby a sudden leftward return movement to its open position. A similar sudden snap action returning movement will be imparted to the actuating member 50 if it is exposed to the restoring forces of the upper switch arm 34 only.

Fig. 1 shows the socket core 20 with its switch body 12 interlocked within the socket housing 13. Such core 20 may be shaped to form also a part of a wall of the switch housing in which the core is inserted and interlocked as described herein. The socket housing 13 has two aligned passage openings of a size corresponding to the passage openings 12–1 and 12–2 of the mounting body 12. The socket core 20 with its switch body 12 may be readily removed from the socket housing 13 by pushing a pin through lower wide open end of the socket housing 13 into a channel 22 of mounting body 12 and raising with the pin the free contact arm end 35 until it releases the actuating member 50 which is then removed from the assembly, whereupon the socket core 20 with its switch body 12 may be freely removed from wide open side of the housing 13. The socket core 20 with its switch may be readily combined with its socket housing 13 by inserting the core 20 into the interior of the housing with the passage openings 12–1, 12–2 of the core body 12 properly aligned with the housing openings whereupon the actuating member 50 is inserted with its smaller end 59 through the aligned large passage openings and pushed inwardly until the switch member portion 37 becomes interlocked with notch depression 51 of actuating member 50.

The mounting portion 32 of the switch member 30 may be affixed to the adjacent mounting wall portion 21 in a variety of ways. A satisfactory mounting is provided by forming the opposite edges of the flat mounting strip portion 32 with laterally bent tooth projection 32–1 which are wedged against the parallel side walls of the open channel 22 of the mounting wall 23.

A further phase of the invention are electric light sockets which are much simpler to wire and embodying features which greatly simplify their manufacture.

The switch contact member 31 is part of a U-shaped clamp formed of a stiff elastic metal strip having an upper terminal arm 31–2 and affixed by clamping to mounting wall 27 of core body 12 (Figs. 1, 3, 8B, 8D). The mounting wall 27 has a recess, as shown in Fig. 8B in which the upper fixed contact terminal arm 31–2 is retained. The inward end of the fixed contact terminal arm 31–2 has terminal portion 28 with two upward terminal jaws 28–1, 28–2.

The cylindrical socket sleeve 13 is affixed against axial and rotary movement by inwardly deforming or clinching it into the segmental arcuate grooves 62 and between the teeth 61 formed in lower part of the insulating mounting body 12 (Figs. 1, 3, 8A, 8B). The terminal sleeve 11 has a stiff elongated metallic connector strip 24 which is retained in a mounting recess 25 of the mounting body and has an outwardly bent lower lip 24–1 over which the inner edge of the cylindrical socket terminal sleeve 13 is clamped (Fig. 3, 8A, 8B). The somewhat wider upper portion of the connector strip 24 is retained within the mounting recess 25 by shoulder portions 25–1 of the recessed body. The upper part of the connector strip 24 has upward terminal jaw portion 26 with terminal jaws 26–1, 26–2.

A pivot boss projection 65 of the mounting body 12 is positioned between the two pairs of jaws 26, 28 for pivotally holding a cylindrical pivot pin 67 which passes between and engages the opposite jaws of the two pairs of terminal jaws 26, 28. The pivot pin 67 has two funnel-shaped holes 68 aligned with the terminal jaws 26, 28. The funnel holes 68 are shaped to receive the two stripped conductor ends 71 which are inserted through the wider funnel openings of the two funnel holes 68 over the front terminal jaw lips 28–2 toward the rear wall of the pivot projection 65 with the conductor ends 71 passing over the higher jaw lips 26–1, 28–1 of the two terminal jaws 26, 28 (Figs. 1, 3, 8A to 8E). The pivot pin 67 is so arranged that when it is turned 90° from the position of Figs. 1, 3, 8B, 8D to the position of Fig. 8E, the cylindrical pin surface wedges the two conductor ends 71 between the pin surface and the respective two pairs of terminal jaws 26, 28 to assure positive conducting connection therebetween (Figs. 8D, 8E). The pivot pin has two small locking projections 67–3 which ride on the inner surfaces of the two terminal jaws 26, 28 when the pivot pin 67 is turned, and they are arranged to pass over the lower terminal jaw lips 68–2 and become interlocked therewith so as to prevent inadvertent turning of the pivot pin 67 from the conductor clamping position of Fig. 8E. Application of a positive turning force to the pivot grip 67–2 permits turning of the pivot pin from the clamping position of Fig. 8E to the releasing position of Fig. 8D.

There are other ways for connecting the flexible supply cord to the switch and socket terminals on the small top surface of the insulating mounting body 12 of a socket of the type described above in accordance with the invention.

Fig. 8G is a view similar to Fig. 3 of the top portion of the mounting body 12–5 exemplifying one form of such modified connector arrangement between the switch and socket terminals and the two conductor ends of the two supply cords; and Figs. 8H, 8I are cross-sectional views thereof along lines 8H—8H and 8I—8I of Fig. 8G respectively. In this modified arrangement, the top surface of insulating mounting body 12–5 of the socket core has a boss projection 90 of insulating material extending over about a half or somewhat more of its top surface. The boss projection 90 has two longitudinal channels 91, 92 extending in a direction generally parallel to the top surface of the mounting body 12–5. The fixed terminal of this socket—which may be affixed to an upper mounting wall of mounting body 12–5 as seen in Figs. 1 to 8—has on the top thereof a stiff resilient terminal strip extension 28–5 held within the channel 91 directly above the bottom surface thereof. The connector strip of the terminal sleeve 11 of this socket is similar to that of Figs. 1 to 8 but it has a stiff resilient upper terminal strip extension 26–5 held within the second boss channel 92 directly above the bottom surface thereof. The two boss channels 91, 92 are arranged so that the two stripped conductor ends 71 of the supply cord 71–1 may be inserted in the two boss channels over the top of the two terminal strips 28–5, 26–5 (Fig. 8H), respectively, whereupon two wedging plugs 93 of insulating material, for instance, are forced into the boss channels 91, 82 above the conductor ends 71 for firmly clamping them with a wedging action against the underlying terminal strips 28–5, 26–5 of the switch and socket assembly. The boss projection 90 may have a roof portion indicated by dash-line 96 overlying the top surface region of the mounting body 12–5 through which the terminal strips 28–5, 26–5 and the two stripped conductor ends 71 pass into the two boss channels 91, 92. Otherwise, the socket of Figs. 8G, 8H is similar to that of Figs. 1 to 8E.

According to the invention, a plurality of flexible switch members of the type described above are combined into a multiple switch device in which the several switches are arranged to cooperate with similar switch actuating structures movable transverse to the switching movement of the individual switches for selectively actuating either one or several of them to the closed positions or to return them to their open positions.

Figs. 9 to 9D show one form of such multiple switch arrangement of the invention in its application to an electric lamp socket similar to that of Figs. 1 to 8 but having two switches designed for selectively energizing either one or both filaments of a conventional two filament light bulb. Fig. 9 is a cross-sectional view similar to Fig. 1 of the switch part of such a socket for such two filament light bulb, and Figs. 9A, 9B, 9C, 9D are views of the same switch structure along lines A—A, B—B, C—C of Fig. 9. The socket shown is similar to that of Figs. 1 to 8 and has two similar flexible switches 1-30, 2-30, arranged to be selectively actuated to the closed position or released to an open position by similar movement of an actuating structure through the arm spacing of the switches in a direction transverse to the direction in which the outer switch arm 34 of each switch is moved to close or open its contact with a snap action.

The socket of Figs. 9 to 9D has an insulating mounting body 3–12 with two switch compartments 3–18 holding the two switches 1–30, 2–30, each of which has a mounting portion 32 held affixed to mounting body 3–12 as by wedging its angularly bent wedging teeth 32–1 within recesses of the lower mounting wall of the mounting body 3–12, as in the socket of Figs. 1 to 8.

The two switch members 1-30, 2-30 are arranged for selective actuation between their closed positions and their open positions by movement of elongated cam shaped switch actuating structures through their arm spacings in a direction transverse to the switching movement of the flexible arms of the two switch members. In accordance with the invention, the cam actuating structures are so shaped and arranged as to permit selective actuation of either switch member 1-30 only or of switch member 2-30 only or simultaneous actuation of both switch members 1-30 and 2-30 to the closed position or to return them to the open position.

As shown in Figs. 9 to 9C, the right switch member 2-30 is held in its mounting compartment 3–18 in a position slightly displaced in backward direction as seen in Fig. 9A and also in vertical direction. This arrangement simplifies the shaping of the actuating structures arranged to move between the switch arms of both switches in a direction transverse to the switching direction for selectively closing and opening either one or both switches. Switch member 1-30 is arranged to cooperate with an actuating structure 1-50 having a series of outward cam surface elements 1-51, 1-52, 1-53 and a series of inward cam surface elements 1-55, 1-56, 1-57 cooperating with the outer arm 34 and the inner arm 33 of switch member 1-30 for causing it to close its contacts with a snap action by rightward movement of the cam surface elements (Fig. 9), and to cause the switch member to open with a snap action—in the same manner as the similar cam elements 51, 52, 53, 55, 56, 57 of the actuating member 50 of Figs. 1 to 8 cooperate with the switch member to close and open its contacts with a snap action.

The similar second switch member 2-30 is arranged to cooperate with a similar actuating structure 2-50 having a series of outward cam surface elements 2-51, 2-52, 2-53 and a series of inward cam surface elements 1-55, 1-56, 1-57 cooperating with the outer arm 34 and inner arm 33 of switch member 2-30 for causing it to close and open its contact with a snap action by rightward and leftward movement of these cam surface elements as in the case of switch member 1-30.

The two cam structures 1-50, 2-50 of the actuating structures may form parts of a single integral structure as will be described hereinafter or as shown in Figs. 9 to 9D, they may form two separate actuating members each individually movable from the open position shown in Fig. 9 to the rightward closed position in which the individual switch members are actuated to a closed position and returned from the right to the left position shown for causing the respective switch member to open with a snap action.

The two switch actuating members 1-50, 2-50 are so shaped for guided movement in the mounting body 3-12 that only actuating member 1-50 may be moved between the open left position to the closed right position (Fig. 9) for closing and opening switch 1-30 only; or that only actuating member 2-50 may be similarly moved for closing and opening switch 2-30 only; or that both actuating members 1-50 and 2-50 may be actuated simultaneously to move between the left open and the right closed position for simultaneously closing or opening both switches 1-30 and 2-30 with a snap action.

Each of the two actuating members 1-50, 2-50 forms a substantially rigid elongated structure for movement in guide passages of mounting body 3-12 between the left open position of Fig. 9 to the rightward closed position to which either one may be selectively brought for closing either one or both of the two switches with a snap action and from which they may be returned to the left open position for selectively opening the respective switches with a snap action. Actuating member 1-50 has a lateral reinforcing rib 2, the right end of which (Figs. 9, 9A) forms a stop which is stopped by the inner surface of right mounting body wall 76 when this actuating member is brought to its right closed position. Actuating member 2-50 has a lateral reinforcing rib 4 (Fig. 9A), the similar right end of which (Fig. 9) forms a stop which is stopped by the inner surface of mounting wall 76 when this actuating member reaches its right closed position. The left mounting wall 75 of mounting body 3-12 has a guide passage 75-1 shaped for guiding therein the longitudinal movement of the two actuating members 1-50, 2-50 between the left open position and the right open position (as seen in Fig. 9).

At their left ends (Fig. 9D) which project outwardly from the mounting body 3-12 and the socket housing 3-13, the two actuating members 1-50, 2-50 are provided with grip portions 1-50-1, 2-50-1, respectively, by which they may be selectively gripped for pushing either one or both of them to the inward closed position or for returning them to the outward position when closing or opening one or the other or both of the two switches.

At their right ends (Fig. 9) the two actuating members 1-50, 2-50 are guided in their longitudinal movement between their closed and open positions by similar guide passages 76-1 formed in the right mounting body wall 76 and they have tapered end portions 1-50-2, 2-50-2 by which they may be pushed through left side mounting wall passage 75-1 rightwardly to their inward operative position shown in Fig. 9 in the same way as actuating member 50 may be pushed to its inward operative position of the socket mounting body of Figs. 1 to 8.

With this arrangement, application of a push force to either one of the left end grips 1-50-1, 2-50-1 (Fig. 9) will move either one of the actuating members 1-50, 2-50 to the inward position for selectively actuating either one of the two switch members 1-30, 2-30 to the closed position. A push force applied, as by a finger, to the aligned left ends (Figs. 9, 9D) of the two actuating members 1-50, 2-50 will bring them both to their inward closed positions thereby actuating both switches 1-30, 2-30 to their closed positions. A similar push force applied to both aligned right ends of the so inwardly pushed actuating members 1—50, 2—50 will return both of them and their associated switches 1—30, 2—30 to their open positions.

The two actuating members 1—50, 2—50 have their cam surfaces so shaped that they form inwardly extending notches which are interlockingly engaged by the outer arms 34 of the two switch members 1—30, 2—30 so as to prevent removal of the two actuating members from their operative position between the switch arms of the two switches, similar to the interlocking of switch member 30 of the socket of Figs. 1 to 8 with the notch of actuating member 50. As in the socket of Figs. 1 to 8, either one or both of the two actuating members 1—50, 2—50 may be removed from its interlocked position within mounting body 3—12 by pushing one or two pins inwardly through channel openings on the bottom wall of mounting body 3—12 until the front end of each switch is lifted to a raised releasing position in which either of the actuating members 1—50 or 2—50 or both may be removed in leftward direction from the mounting body 3—12, which thereupon may be removed through the open side of the housing 3—13 if both actuating members 1—50, 2—50 have thus been removed. All cam surface regions of the two actuating members 1—50, 2—50 are aligned and they are so shaped and arranged that they may be inserted with their tapered right ends through the left wall passage opening 75—1 into the inward operative position shown in Fig. 9A, wherein the cam actuating surfaces of the two actuating members are in proper operative relation to the arm portions of the two switches 1—30, 2—30 with which they cooperate. Otherwise, the socket mounting body 3—12 and socket housing 3—13 and the associated elements of the socket of Figs. 9 to 9D are constructed in the same way as the corresponding parts of the socket of Figs. 1 to 8.

Figs. 10 to 11 show principal parts of one form of a socket core of a two switch three-way lamp socket exemplifying the invention. The socket core is similar to that of Figs. 1 to 8 except that it has a somewhat wider core body portion for housing two switches. The socket core 1—20 has an insulating mounting body which carries two flexible switch members 1—30, 2—30 identical with the switch member 30 of Figs. 1 to 8. Each of the two flexible switch members 1—30, 2—30 has its mounting portion 32 held affixed with its angularly bent wedging teeth 32—1 within a recessed, lower mounting wall portion of the mounting body. The mounting body has two switch compartments 1—18 in which are positioned the movable parts of the two switch members 1—30 and 2—30 in the same way as similar switch member 30 is positioned in switch compartment 18 of mounting body 12 of Figs. 1 to 8. The two flexible switch members 30—1 and 30—2 are identical except for the fact that one switch member has an L-shaped terminal tail portion which makes contact with the concentric terminal of a two-filament light bulb.

The two switch members 1—30, 2—30 are arranged for selective actuation between their closed positions and their open positions by movement of an elongated switch actuating member 80 through their arm spacings in a direction transverse to the switching movement of the two switches. The switch actuating member 80 is arranged to be set in three different angular settings so that movement of the actuating member in one or first setting only switch member 30—3 is actuated, and in the second setting, only the second switch member 30—2 is actuated, and in the third setting both switch members 30—1 and 30—2 are actuated between their open and closed positions.

Figs. 10, 10A and 11A to 11E show how the different elements of the actuating member 80 and of the two switch members 30—1, 30—2 perform selectively the circuit closing and opening operations. The actuating member 80 has an intermediate control region 81, positioned between the outer arm 34 and the inner arm 33 of each of the two flexible switch members 1—30, 2—30 in each of the three different settings. The elongated actuating member 80 is arranged for longitudinal movement from a left side circuit opening position in which it is shown in Fig. 10 to a rightward circuit closing position in a manner analogous to the elongated actuation of the elongated actuating member 50 of the switch of Figs. 1 to 8. The elongated switch actuating member 80 has at its left end a pointer-like turning grip 80—1 and is guided in each of its three different settings in a positive manner by an octagonal front guide portion 82 and a similar octagonal rear guide portion 83 which move in correspondingly shaped octagonal guide passages such as 83—1 of opposite side walls 18—4 of the mounting body. The left and right end parts of the elongated actuating member 80 are also provided with cylindrical guide surface portions 84, 85 arranged to permit free turning thereof within the octagonal wall guide passages 82—1, 83—3 when in the leftward open position of Fig. 10.

In the leftward open position (Fig. 10), the actuating member 80 may be turned on its cylindrical guide surfaces 84, 85 to any one of its three different settings. When the actuating member 80 is moved to the right from its open position of Fig. 10 to perform switch controlling movement in any of its three settings, it will be prevented from turning by engagement of its octagonal guide surfaces 82, 83 with the octagonal guide passage openings 82—1, 83—1 of the mounting body 1—12.

The actuating member 80 has along its control region 81 three sets of control surface elements corresponding to the three settings which are arranged to perform the different switching operations in the three different settings, respectively. In the "double-switch setting," the actuating member 80 causes both switch members 1—30, 2—30 to be closed and opened; in the "rear-switch setting" the actuating member causes the rear switch member 2—30 only to be closed and opened; and in the "front-switch setting" the actuating member causes the opening and closing of the front switch member 1—30 only.

*Double switch setting.*—Figs. 10, 11A to 11E show the actuating member 80 in its double switch setting. In this setting, its control region 81 has one set of notch-like outwardly tapered cam elements 1—51, 1—52, 1—53 cooperating with the upper arm 34 of switch member 1—30 and a similar other set of notch-like outwardly tapered cam elements 2—51, 2—52, 2—53, cooperating with the upper arm 34 of the second switch member 2—30 for either bringing both of them to their closed positions and returning both of them to their open positions in the same manner as the generally similar cam elements 51, 52, 53 of actuating member 50 cooperate with the upper arm 34 of switch member 30 of the socket of Figs. 1 to 8. The two sets of cam elements 1—51, 1—52, 1—53 and 2—51, 2—52, 2—53 are aligned in a substantially vertical plane in which they are shown and are so arranged that when the actuating member 80 is moved from the left open position shown toward the right, the two sets of cam elements come into engagement with the flanged edges of the upper contact arm portion 35 of each of the two switch members 1—30, 2—30 and deform them in upward and lateral direction until their two contact elements 35 are brought with a snap action into circuit-closing contact with the fixed switch contact member in the same manner as the cam surface elements 51, 52, 53 of actuating member 50 effect snap action closure of the switch 30 of the socket of Figs. 1 to 8.

The actuating member 80 is restrained against rotation from its double switch setting (unless forcibly turned therefrom to another of its three settings) by restraining actions of flat outer contact arm portion 37 and flat inner contact arm portion 41 of switch member 1—30 acting on the flat control surface element 1—51 and opposite flat control surface element 1—51—1 the actuating member 80 embraced by the two switch arms 34, 33 (Fig. 10). Additional rotation restraining action is secured by the flat upper contact arm portion 35 and the flat inner contact arm portion 41 of the other switch member 2—30 acting on the flat control surface element 2—51 and the opposite flat control surface element 2—51 of the part of the actuating member 80 embraced by these two arms of the switch member 2—30.

*Rear switch setting.*—In its open left side position when the turn grip 80—1 is turned 45° to the left (as seen in Fig. 11A), the actuating member 80 is brought to the rear switch setting in which its rightward movement (Fig. 10) effects snap action closure of the rear switch member 2—30 only and snap action opening thereof by leftward return movement of the actuating member 80. In this rear switch setting, the second switch member 2—30 is brought into cooperative relationship with the transversely moving outwardly tapering vertically aligned cam surface elements 3—51, 3—52, 3—53 of actuating member 80 (as shown in end profile of Fig. 11C) which are arranged to cooperate therewith for causing the upper arm 34 of the switch member 2—30 to close and open its circuit with a snap action in the same way as cam elements 51, 52, 53 of actuating member 50 cooperate with the outer arm of switch member 30 of the socket of Figs. 1 to 8 in closing and opening it.

The actuating member 80 is restrained against a rotation from its rear switch setting unless forcibly turned therefrom by the flat surfaces of the outer switch arm 35 and inner switch arm 41 of rear switch member 2—30 acting on the flat control surface elements 3—51 and elements 3—51-1 of the actuating member 80 embraced by these two switch arms.

*Front switch setting.*—In its open left side position when the turn grip 80-1 of the actuating member 80 is turned 45° to the left from its rear switch setting, or 90° to the left from its double switch setting (as seen in Fig. 11A), the actuating member 80 is brought to its front switch setting in which its rightward movement (Fig. 10) effects snap action circuit closure of the front switch member 1—30 only and snap action opening thereof by leftward return movement of the actuating member. In this front switch setting, the actuating member control region 81 has a set of notch-like outwardly tapering cam elements 4–51, 4–52, 4–53, aligned in a vertical plane (Figs. 10, 11A) arranged to cause the upper arm 34 of front switch member 1—30 to close and open its circuit with a snap action by transverse movement of the actuating member 80 in the same manner as the generally similar cam elements 51, 52, 53 of actuating member 50 cooperate with the upper arm of switch member 30 of Figs. 1 to 8 for closing and opening the same.

The actuating member 80 is restrained against turning from this front switch setting by the restraining engagement of its opposite flat cam surface elements 4-51 and 4-51-1 (Figs. 10, 11A) with the extended flat surfaces of the opposite contact arm portions 35 and 41 of switch member 1-30 embracing the same in a manner analogous to restraining action exerted by the two switches on the corresponding flat turning restraining control surface elements of the actuating member 80 in its other two switch settings, as explained above.

The actuating member 80 has its four sets of cam surfaces so shaped that they form on its exterior inwardly extending notches which are interlockingly engaged by the outer arms 34 of the two flexible switch members 1-30, 2-30 as to prevent removal of the actuating member 80 from its operative position between the switch arms of the two switches 1-30, 2-30 in all its settings in the same manner as the switch member 30 of the socket of Figs. 1 to 8 is interlocked with the notch of the actuating member 50. As in the socket of Figs. 1 to 8, the actuating member 80 may be removed from its interlocked operative position within its mounting body 1-12 and its switches 1-30, 2-30 by pushing two pins inwardly through the opening channels on the bottom wall of the mounting body 1-12 until the two front ends of the switches are lifted to a raised position in which the actuating member 80 is released and may be removed in the leftward direction from the mounting body 1-12 (as seen in Fig. 10). All aligned raised cam surface portions 1-53, 3-53, 4-53 and its octagonal guide regions 82, 83 of the actuating member 50 are arranged so that it may be inserted with its tapered front end through the mounting wall opening (at the left as seen in Fig. 10) into its inward operative position of Fig. 10 to 11E, wherein the actuating member 80 may be forcibly turned to any of its three settings.

Otherwise, the socket mounting body 1-12 and its associate elements are constructed in the same manner as the corresponding parts of the socket of Figs. 1 to 8.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

I claim:

1. In a switch device, a mounting structure, at least two elongated elastically deformable and strip-shaped flexible switch members each having an inner arm held by said mounting structure and an outer contact arm carried by said inner arm at an arm spacing from said mounting structure and movable in a switching direction between a released open position and a closed outer position from which it is returned by its elastic restoring energy to said open position, and movable actuating portions positioned in the arm spacing of the two switch members and having two sets of cam elements each movable transversely to said switching direction through said arm spacing between an open position and a closed position for selectively actuating either one or the other of said two contact arms to either its closed or open positions, certain of said cam elements being effective during partial movement thereof from one to the other of said two positions to laterally flex the actuated contact arm, certain of the moving cam elements being effective during their further movement towards said other position to release the restoring energy stored in the actuated switch member by said lateral flexing for bringing said laterally flexed contact arm with a snap action from said one position towards said other position.

2. In a switch device, a mounting structure, at least two elongated elastically deformable and strip-shaped flexible switch members each having an inner arm held by said mounting structure and an outer contact arm carried by said inner arm at an arm spacing from said mounting structure and movable in a switching direction between a released open position and a closed outer position from which it is returned by its elastic restoring energy to said open position, and movable actuating portions positioned in the arm spacing of the two switch members and having two sets of cam elements each movable transversely to said switching direction through said arm spacing between an open position and a closed position for selectively actuating either one or the other of said two contact arms to either its closed or open positions, certain cam elements of said actuating portions being movable through said arm spacing between said open position and said closed position for selectively actuating both of said contact arms to either their closed or their open positions, certain of said cam elements being effective during partial movement thereof from one to the other of said two positions to laterally flex the actuated contact arm, certain of the moving cam elements being effective during their further movement towards said other position to release the restoring energy stored in the actuated switch member by said lateral flexing for bringing said laterally flexed contact arm with a snap action from said one position towards said other position.

3. In a switch device, a mounting structure, at least two elongated elastically deformable and strip-shaped flexible switch members each having an inner arm held by said mounting structure and an outer contact arm carried by said inner arm at an arm spacing from said mounting structure and movable in a switching direction between a released open position and a closed outer position from which it is returned by its elastic restoring energy to said open position, and movable actuating portions positioned in the arm spacing of the two switch members and having two sets of cam elements each movable transversely to said switching direction through said arm spacing between an open position and a closed position for selectively actuating either one or the other of said two contact arms to either its closed or open positions, certain cam elements of said actuating portions being movable through said arm spacing between said open position and said closed position for selectively actuating both of said contact arms to either their closed or their open positions, certain of said cam elements being effective to laterally flex the associated contact member against the action of its elastic restoring energy during partial movement of said certain cam elements from their open to their closed position and being effective during further movement of said cam elements to their closed position to release the restoring energy stored in said switch member by said lateral flexing for bringing said contact arm with a snap action to its closed position.

4. In a switch device, a mounting structure, at least two elongated elastically deformable and strip-shaped flexible switch members each having an inner arm held by said mounting structure and an outer contact arm carried by said inner arm at an arm spacing from said mounting structure and movable in a switching direction between a released open position and a closed outer position from which it is returned by its elastic restoring energy to said open position, and movable actuating portions positioned in the arm spacing of the two switch members and having two sets of cam elements each movable transversely to said switching direction through said arm spacing between an open position and a closed position for selectively actuating either one or the other of said two contact arms to either its closed or open positions, certain cam elements of said actuating portions being movable through said arm spacing between said open position and said closed position for selectively actuating both of said contact arms to either their closed or their open positions, certain of said cam elements being effective during partial movement thereof from their closed to their open positions to laterally flex the actuated associated contact member against the action of its elastic restoring energy, certain of the moving cam elements being effective during their further movement to their open positions to suddenly release restoring energy stored in the associated switch member in its closed position and cause it to be released from its closed position with a snap action.

5. In a switch device, a mounting structure, at least two elongated elastically deformable and strip-shaped flexible switch members each having an inner arm held by said mounting structure and an outer contact arm carried by said inner arm at an arm spacing from said mounting structure and movable in a switching direction between a released open position and a closed outer position from which it is returnable by its elastic restoring energy to said open position, and movable actuating portions positioned in the arm spacing of the two switch members and having two sets of cam elements each movable transversely to said switching direction through said arm spacing between an open position and a closed position for selectively actuating either one or the other of said two contact arms to either its closed or open positions, certain cam elements of said actuating portions being movable through said arm spacing between said open position and said closed position for selectively actuating both of said contact arms to either their closed or their open positions, certain of said cam elements being effective to laterally flex the associated contact member against the action of its elastic restoring energy during partial movement of said certain cam elements from their open to their closed position and being effective during further movement of said cam elements to their closed position to release the restoring energy stored in said switch member by said lateral flexing for bringing said contact arm with a snap action to its closed position, certain of said cam elements being effective during partial movement from their closed to their open position to laterally flex said contact arm while it is in its closed position, and being effective during further movement to the open position to suddenly release restoring energy stored in said switch member in its closed position for releasing said contact arm with a snap action from its closed position and returning it to its open position.

6. In a switch device as claimed in claim 4, said snap action movement of the contact arm relatively to the associated switch contact in closing or opening the associated circuit being accompanied by contact wiping action between the contact portion of said contact arm and said associated switch contact.

7. In a switch device as claimed in claim 4, said actuating portions having a recessed detent portion, and at least one of said switch members being elastically biased to a locking position in which it tends to maintain locking engagement with said detent portion for restraining removal of said actuating portion from their operative position relatively to said switch member.

8. In a switch device as claimed in claim 4, said actuating portion having a recessed intermediate detent portion and at least one of said switch members being elastically biased to a locking position in which it tends to maintain locking engagement with said detent portion for restraining said actuating portions in their open position and preventing removal thereof from their operative position in a direction opposite to their movement toward their closed position, while permitting control movement thereof between their open and closed positions.

9. In a switch device as claimed in claim 4, said actuating portions having a stop portion arranged to engage a stop portion of said mounting structure to prevent removal of said actuating portions from their operative position by movement in a direction towards their closed position.

10. In a switch device as claimed in claim 9, said stop portion preventing movement of said actuating portions beyond its closed position and said detent portion preventing movement of said actuating portions in a direction toward their open position beyond their open position.

11. In a switch device as claimed in claim 4, some of said cam elements of said actuating portions being shaped for engagement with portions of and actuation by the restoring energy of the released switch member to return said actuating structure to its open position as said switch member is returned by said energy to its open position.

12. In a switch device as claimed in claim 5, some of said cam elements of said actuating portions being shaped for engagement with portions of and actuation by the restoring energy of the released switch member to return said actuating structure to its open position as said switch member is returned by said energy to its open position.

13. In a switch device as claimed in claim 1, said mounting structure having also two opposite mounting wall portions and two opposite guide openings in said two wall portions for guiding therein two outer portions of said actuating portions in movement thereof between their open and closed positions, said actuating portions being held interlocked in said guide openings by locking engagement of said actuating structure with said switch member when said switch member is in one of its operative positions, said mounting structure having additional opening portions through which said switch member may be actuated from the exterior of said mounting structure to a releasing position in which said actuating portions are released from said locking engagement and in which said actuating portions may be relatively freely withdrawn from said mounting structure through one of said guide openings.

14. In a switch device as claimed in claim 1, said switch device also having a housing with two opposite housing wall portions and two opposite housing openings in said two housing wall portions for passing therethrough two outer portions of said actuating portions in movement thereof between their open and closed positions, said actuating portions being held interlocked in said housing openings of said housing wall portions by locking engagement of said actuating portions with said switch member when said switch member is in one of its operative positions, said device and said housing having additional aligned opening portions through which said switch member may be actuated from the exterior of said housing to a releasing position in which said actuating portions are released from said locking engagement and in which said actuating portions may be relatively freely withdrawn from said housing through one of said housing openings.

15. In a switch device as claimed in claim 14, said mounting structure with its switch member being relatively freely removable from said housing upon removal of said actuating structure from said mounting structure through one of said housing openings.

16. In a switch device as claimed in claim 4, said mounting structure having also two opposite mounting wall portions and two opposite guide openings in said two wall portions for guiding therein two outer portions of said actuating portions in movement thereof between their open and closed positions, said actuating portions being held interlocked in said guide openings by locking engagement of said actuating structure with said switch member when said switch member is in one of the operative positions said mounting structure having additional opening portions through which said switch member may be actuated from the exterior of said mounting structure to a releasing position in which said actuating portions are released from said locking engagement and in which said actuating portions may be relatively freely withdrawn from said mounting structure through one of said guide openings.

17. In a switch device as claimed in claim 4, said switch device also having a housing with two opposite housing wall portions and two opposite housing openings in said two housing wall portions for passing therethrough two outer portions of said actuating portions in movement thereof between their open and closed positions, said actuating portions being held interlocked in said housing openings of said housing wall portions by locking engagement of said actuating portions with said switch member when said switch member is in one of its operative positions, said device and said housing having additional aligned opening portions through which said switch member may be actuated from the exterior of said housing to a releasing position in which said actuating portions are released from said locking engagement and in which said actuating portions may be relatively freely withdrawn from said housing through one of said housing openings.

18. In a switch device as claimed in claim 17, said mounting structure with its switch member being relatively freely removable from said housing upon removal of said actuating structure from said mounting structure through one of said housing openings.

19. In a switch device as claimed in claim 1, the different sets of cam elements associated with the different switch members being parts of two distinct actuating members, each movable between an open and a closed position corresponding to the open and closed positions of said switch members.

20. In a switch device as claimed in claim 19, said two actuating members being positioned adjacent to each other and being independently movable between their closed and open positions.

21. In a switch device as claimed in claim 20, each of said two actuating members having a set of opposite exposed grip portions manually engageable for bringing the respective actuating member to its closed or open positions, respectively.

22. In a switch device as claimed in claim 21, the grip portions of the two actuating members which are actuated to bring them in common to their closed positions being aligned so that they present aligned gripping surfaces engageable as a unit for actuating them to their closed positions.

23. In a switch device as claimed in claim 22, the grip portions of the two actuating members which bring them to their open positions being aligned so that they present aligned gripping surfaces engageable as a unit for actuating them to closed position.

24. In a switch device as claimed in claim 1, said two actuating members being positioned adjacent to each other and being independently movable between their closed and open positions, each of said two actuating members having a set of opposite exposed grip portions manually engageable for bringing the respective actuating member to its closed or open positions, respectively, the grip portions of the two actuating members which are actuated to bring them to their closed positions being aligned so that they present aligned gripping surfaces engageable as a unit, the grip portions of the two actuating members which bring them to their open positions being aligned so that they present aligned gripping surfaces engageable as a unit.

25. In a switch device as claimed in claim 1, the different sets of cam elements associated with the different switch members being parts of a single actuating member each movable over an actuation path between an open and closed position corresponding to the open and closed positions of said switch members.

26. In a switch device as claimed in claim 25, said actuating structure being movable in a direction transverse to said actuation path to two different actuation settings, one set of said cam elements being arranged to cooperate with one of said switch members in one of said actuation settings for actuating it between its open and closed positions and the other set of cam elements being arranged to cooperate with the other of said switch members in another actuating setting of said actuating member for actuating it between its open and closed positions.

27. In a switch device as claimed in claim 26, said actuating member being also movable in said transverse direction to an additional actuation setting, and some of the cam elements of said actuating member being arranged to cooperate in said additional actuation setting with both of said switch members for actuating both of said switch members between their open and their closed positions when said actuating member is correspondingly moved between its closed and open positions.

28. In a switch device as claimed in claim 1, the different sets of cam elements associated with the different switch members being parts of a single actuating member each movable over an actuation path between an open and closed position corresponding to the open and closed positions of said switch members, said actuating structure being movable in a direction transverse to said actuation path to two different actuation settings, some of said cam elements being arranged to cooperate with one of said switch members in one of said actuating settings for actuating it between its open and closed position, and some of the cam elements of said actuating member being arranged to cooperate with both of said switch members for actuating both of said switch members between their open and their closed positions when said actuating member is correspondingly moved between its closed and open positions.

References Cited in the file of this patent

UNITED STATES PATENTS

| | | |
|---|---|---|
| 1,536,086 | Douglas | May 5, 1925 |
| 1,862,738 | Douglas | June 14, 1932 |